US009875550B2

United States Patent
Liu et al.

(10) Patent No.: US 9,875,550 B2
(45) Date of Patent: Jan. 23, 2018

(54) METHOD AND DEVICE FOR TRACKING SPORTS PLAYERS WITH CONTEXT-CONDITIONED MOTION MODELS

(71) Applicant: Disney Enterprises, Inc., Burbank, CA (US)

(72) Inventors: Jingchen Liu, Burbank, CA (US); G. Peter K. Carr, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1096 days.

(21) Appl. No.: 14/012,680

(22) Filed: Aug. 28, 2013

(65) Prior Publication Data

US 2015/0066448 A1 Mar. 5, 2015

(51) Int. Cl.
G06F 7/60 (2006.01)
G06F 17/10 (2006.01)
G06T 7/20 (2017.01)
G06K 9/00 (2006.01)

(52) U.S. Cl.
CPC ............ *G06T 7/20* (2013.01); *G06K 9/00724* (2013.01); *G06T 2207/20076* (2013.01); *G06T 2207/30196* (2013.01); *G06T 2207/30221* (2013.01); *G06T 2207/30228* (2013.01)

(58) Field of Classification Search
CPC ............. G06T 7/20; G06T 2207/20076; G06T 2207/30228; G06T 2207/30196; G06T 2207/30221; G06K 9/00724
USPC .......................................................... 703/2
See application file for complete search history.

(56) References Cited

U.S. PATENT DOCUMENTS

| | | | | |
|---|---|---|---|---|
| 2005/0105765 A1* | 5/2005 | Han | ................... | G06K 9/00295 382/100 |
| 2012/0126973 A1* | 5/2012 | DeAngelis | ......... | A63B 24/0021 340/539.13 |

\* cited by examiner

*Primary Examiner* — Saif Alhija
(74) *Attorney, Agent, or Firm* — Fay Kaplun & Marcin, LLP

(57) ABSTRACT

A method and device generates a trajectory. The method includes receiving a plurality of tracklets indicative of movement of a plurality of targets over a predetermined temporal interval. The method includes determining a plurality of context data for a pair of tracklets based upon at least one additional tracklet. The method includes computing a probability that the pair of tracklets relate to a first one of the targets. The method includes generating a trajectory for the first target based upon a concatenation of select ones of the tracklets. The concatenation maximizes the probability that the pair of tracklets correspond to the first target based upon the context data associated with the pair of the tracklets.

17 Claims, 13 Drawing Sheets

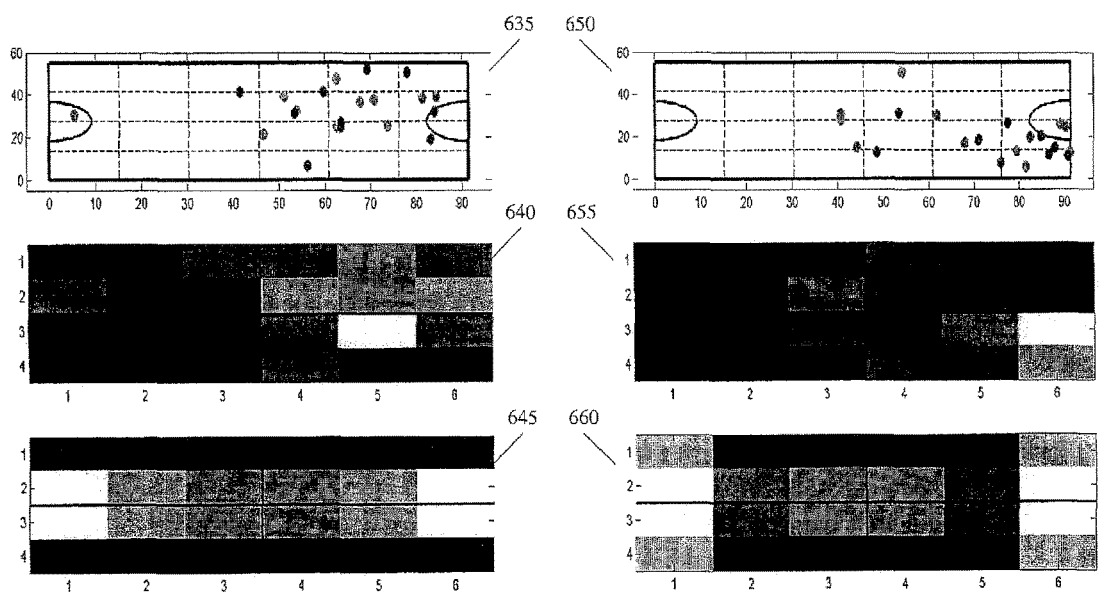
Fig. 6C                    Fig. 6D

METHOD AND DEVICE FOR TRACKING SPORTS PLAYERS WITH CONTEXT-CONDITIONED MOTION MODELS

BACKGROUND INFORMATION

A model of probabilistic object motion is required to track objects as they move so that a tracking algorithm may determine a trajectory from a set of hypotheses that is the most realistic. If multiple objects are being tracked concurrently, prior data is used to evaluate the feasibility of a set of simultaneous trajectories for all the objects being tracked. Conventionally, most multi-object tracking algorithms utilize a drastic simplification to keep the inference problem tractable. Specifically, each of the objects is evaluated in isolation such that each object is tracked independently of other objects. However, object motions are not always independent. In team sports, for example, player movements are highly correlated to both nearby and distant players. It is highly inaccurate to evaluate each trajectory using the conventional method of isolating each object. However, it is also quite difficult to determine and optimize a complex model which describes all possible interactions between players.

With regard to multi-target tracking, this has been a difficult problem of broad interest in the technical field of computer vision. Surveillance is a common scenario in which multi-target tracking is utilized. Team sports are another popular domain utilizing multi-target tracking that has a wide range of applications in strategy analysis, automated broadcasting, and content-based retrieval. Recent developments in pedestrian tracking have utilized a formulation of multi-target tracking in terms of data association. For example, a set of potential target locations is estimated in each frame using an object detector and target trajectories are inferred by linking similar detections (or tracklets) across frames. However, if complex inter-tracklet affinity models are used, the association problem quickly becomes non-deterministic polynomial-time (NP) difficult.

Recent success in pedestrian tracking has posed multi-target tracking as a data association. That is, long object trajectories are found by linking together a series of detections or short tracklets. Conventionally, the problem of associating tracklets across time utilizes a variety of methods such as the Hungarian algorithm, linear programming, cost-flow networks, maximum weight independent sets, continuous-discrete optimization, higher-order motion models, etc. Data association is often formulated as a linear assignment problem where the cost of linking one tracklet to another is some function of extracted features (e.g., motion and appearance). Other conventional methods consider more complex association costs.

With regard to pedestrian tracking, crowds are an extreme case of pedestrian tracking where it is often not possible to see each individual in their entirety, if at all. Because of congestion, pedestrian motions are often quite similar and crowd tracking algorithms typically estimate a finite set of global motions. Often, the affinity for linking two tracklets together depends on how well the hypothesized motion agrees with one of the global motions. A conventional approach solves tracking in crowded structured scenes with floor fields estimation and Motion Structure Tracker (MST), respectively, while another conventional approach uses a Correlated Topic Model (CTM) for crowded, unstructured scenes.

Although more complex approaches have been devised, simple, independent motion models have been popular for pedestrian tracking because they limit the complexity of the underlying inference problem. However, the models may not always characterize the motion affinity between a pair of tracklets accurately. A conventional approach models inter-target correlations between pedestrians using context which consists of additional terms in the data association affinity measure based on the spatiotemporal properties of tracklet pairs (e.g., a pedestrian may deviate from a constant velocity trajectory if he/she anticipates colliding with another pedestrian). Much like differences between the individual target motions in surveillance and team sports, context in team sports (e.g., the current game situation) is more complex and dynamic compared to surveillance. For example, teams will frequently gain and lose possession of the ball and the motions of all players often change drastically when this occurs. Accordingly, an application of the conventional approaches to context does not provide similar or accurate results, particularly in view of the complexity that is introduced in team sports.

Tracking players in team sports has three significant differences compared to pedestrians in surveillance. First, the appearance features of detections are less discriminative due to players on a common team being visually similar (e.g., same uniform). With regard to tracking, the distinguishing characteristics between teammates are primarily position and velocity. Second, pedestrians tend to move along straight lines at constant speed whereas sports players move in more erratic manners. Third, although pedestrians deviate to avoid colliding with each other, the motions between pedestrians are rarely correlated in complex ways (e.g., some scenarios like sidewalks may contain a finite number of common global motions). On the other hand, the movements of sports players are strongly correlated both locally and globally. For example, opposing players may exhibit strong local correlations when "marking" each other (e.g., one-on-one defensive assignments). Similarly, players who are far away from each other move in globally correlated ways because they are reacting to the same ball.

Conventional approaches to multi-tracking in team sports utilize algorithms based on particle filters. However, results are quite often demonstrated only on short sequences (e.g., less than two (2) minutes). Other conventional approaches generate a Bayes network of splitting and merging tracklets for a long ten (10) minute soccer sequence to find the most probable assignment of player identities using max-margin message passing.

In both pedestrian and player tracking, object motions are often assumed to be independent and modeled as zero displacement (for erratic motion) and constant velocity (for smooth motion governed by inertia). In reality, the locations and motions of players are strongly correlated. Pair-wise repulsive forces have been used in multi-target tracking to enforce separability between objects. Conventional approaches use multi-object motion models in pedestrian tracking to anticipate how people will change their trajectories to avoid collisions or for estimating whether a pair of trajectories have correlated motions. In team sports, a conventional approach estimates motion fields using the velocities of tracklets to anticipate how the play will evolve but does not use the motion fields to track players over long sequences. In yet another conventional approach, the standard independent autoregressinve motion model is augmented with a database of a priori trajectories manually annotated from other games.

Because a player's movement is influenced by multiple factors, the conventional multi-target tracking formulation using a set of independent autoregressive motion models is a poor representation of how sports players actually move. Furthermore, motion affinity models involving multiple targets (and that do not decompose into a product of pairwise terms) make the data association problem NP hard.

BRIEF DESCRIPTION OF THE DRAWINGS

FIGS. 6A-D show occupancy maps used by the device of FIG. 1 according to an exemplary embodiment.

FIG. 7A-1 shows a first portion of a relative occupancy map used by the device of FIG. 1 according to an exemplary embodiment.

FIG. 7A-2 shows a second portion of the relative occupancy map of FIG. 7A-1.

DETAILED DESCRIPTION

Figure 1:
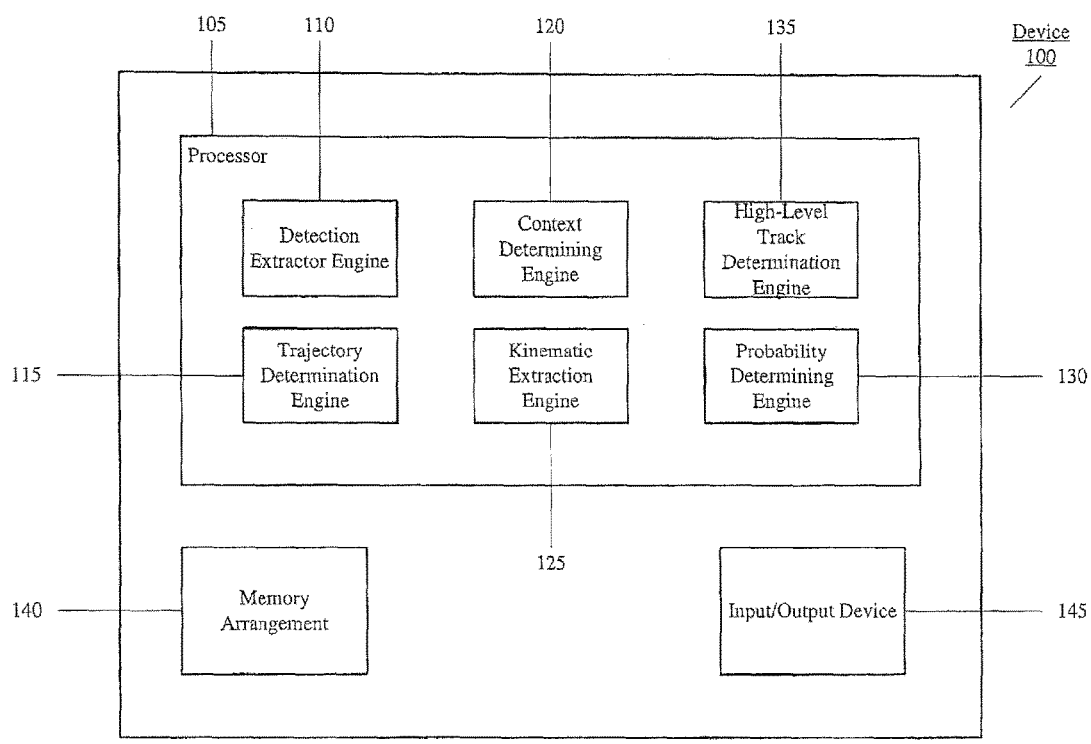
FIG. 1 shows a device for determining trajectories according to an exemplary embodiment.

The present invention relates to a system and method for generating a trajectory. The method comprises receiving a plurality of tracklets indicative of movement of a plurality of targets over a predetermined temporal interval; determining a plurality of context data for a pair of tracklets based upon at least one additional tracklet; computing a probability that the pair of tracklets relate to a first one of the targets; generating a trajectory for the first target based upon a concatenation of select ones of the tracklets, wherein the concatenation maximizes the probability that the pair of tracklets correspond to the first target based upon the context data associated with the pair of the tracklets.

The exemplary embodiments may be further understood with reference to the following description and the appended drawings, wherein like elements are referred to with the same reference numerals. The exemplary embodiments describe a method and device for generating trajectories in a team sport environment. The trajectories are determined based upon data association. Specifically, the data association relates to utilizing a set of detections and game context features. The trajectories are further determined based upon a most probable set of trajectories. The team sport environment, the trajectories, the detections, the game context features, the probability, a related device, and a related method will be described in further detail below.

The exemplary embodiments provide a manner in which data association is an effective solution for sports player tracking by devising an accurate model of player movements that remains tractable by conditioning on features describing the current state of the game such as which team has possession of the ball. The exemplary embodiments provide a new set of broad game context features for team sports and their estimation from noisy detections such as players, a ball, direct observations of game states (e.g., a free throw in basketball), etc. As a result, a better assessment of the affinity between trajectory segments by implicitly modeling complex interactions through a random decision forest based on track and game context features is provided. As will be described in further detail below, the exemplary embodiments are capable of tracking multiple objects or players in a game such as twenty (20) players in over thirty (30) minutes of international field hockey matches or ten (10) players in five (5) minutes of college basketball.

Specifically, the exemplary embodiments define a set of situation-specific motion models which are conditioned on a global state vector. The affinity for joining short mid-level tracklets into one longer high-level track using kinematic properties of both mid-level tracklets and game context features which describe the current situation is evaluated. A random decision forest provides a statistical estimate about the likelihood of joining two mid-level tracklets. Tractability is maintained by evaluating each trajectory in isolation. However, complex higher-order inter-object correlations are implicitly encoded in the game context features and random decision forest. As a result, a framework which is efficiently solvable using cost flow networks that is also able to capture the influence of one player's motion on another is provided.

It should be noted that the exemplary embodiments described below relate to game context features in which objects in the game such as those listed above may be used as a basis to generate the trajectories are only exemplary. Those skilled in the art will understand that the exemplary embodiments may be used with any other environment in which trajectories are generated. For example, the exemplary embodiments may relate to generating trajectories for vehicles, traffic, etc. Furthermore, it should be noted that the use of objects is only exemplary. The exemplary embodiments may be used to track targets which may include an object but may also include "non-objects" such as a general area within a field of view.

FIG. 1 shows a device 100 for determining trajectories according to an exemplary embodiment. The device 100 may be any electronic component that is configured to receive and process data such that the trajectories are determined. The device 100 includes a processor 105, a memory arrangement 140, and an input/output (I/O) device 145. The processor 105 may be configured to execute a plurality of applications of the device 100; the memory arrangement 140 may be configured to store data, particularly those related to the executed applications; and the I/O device 145 may be configured to receive inputs or data. In a specific example, the processor 105 may include a trajectory determining application that is executed. The memory 140 may store data that is received as well as data that is determined for the trajectory determining application. The I/O device 145 may receive the data that is processed from other electronic devices or entered via an input device for the trajectory determining application.

The processor 105 may further include a plurality of engines that are configured to perform a functionality associated with determining the trajectories. As illustrated, the processor 105 may include a detection extractor engine 110, a low-level and mid-level tracklet determination engine 115, a context features determining engine 120, a kinematic features engine 125, a probability determining engine 130, and a high-level track determination engine 135. The engines will be described in further detail below.

Figure 2A:
FIGS. 2A-D show motion models used by the device of FIG. 1 according to an exemplary embodiment.
Figure 2B:
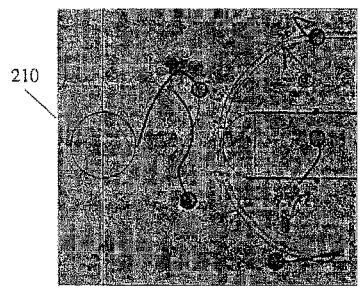
Figure 2C:
Figure 2D:
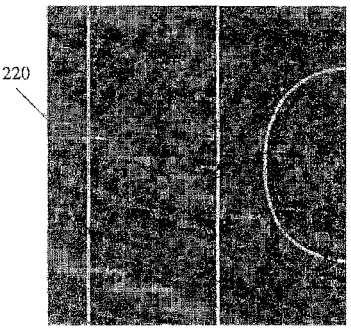

FIGS. 2A-D show motion models used by the device 100 of FIG. 1 according to an exemplary embodiment. Specifically, FIG. 2A illustrates an actual view 205 of a basketball game with a player's future motion superimposed thereon while FIG. 2B illustrates a constructive overhead view 210 of the actual view 205 of FIG. 2A with the player's future motion superimposed thereon. FIG. 2C illustrates an actual view 215 of a field hockey game with a player's future motion superimposed thereon while FIG. 2D illustrates a constructive overhead view 220 of the actual view 215 of FIG. 2C with the player's future motion superimposed thereon. The motion models illustrated in FIGS. 2A-D may be data that is received via the I/O device 145 for the processor 105 to process.

The exemplary embodiments utilize motion models as a basis for determining trajectories. Specifically, a player's future motion is contingent on his/her current motion, as well as a current game situation. The global distribution of players often indicates which team is attacking and local distributions denote roles (or positions being played) and when opposing players are closely following each other. As will be described in further detail below, the contextual information such as these distributions are used to create a more accurate affinity model for tracking players by linking multiple mid-level tracklets. The overhead views 210, 220 of FIGS. 2B and 2D, respectively, show the input detections and corresponding ground truth annotations. As will also be described in further detail below, player trajectories are strongly correlated with both nearby and distant players.

According to the exemplary embodiments, objects (e.g., players) are tracked via data association by first extracting a set of detections O where each detection $O_i=[x_i,t_i,a_i]$ consists of position ($x_i$), time stamp ($t_i$), and appearance information ($a_i$). For example, the detection extractor engine 110 may receive data such as the actual views 205, 215 or the overhead views 210, 220 via the I/O device 145 to extract the detections O. As will be described in further detail below, the device 100 may determine the most probable set of object trajectories $T=\{T_1, T_2, \ldots, T_N\}$ where each trajectory is a temporal sequence of detections $T_n=\{O_a, O_b, \ldots\}$ in which:

$$T^* = \underset{T}{\mathrm{argmax}}\ P(O\mid T)P(T) \quad \text{(Equation 1)}$$

Specifically, the high-level trajectory determination engine 135 may determine the trajectories T*.

It should be noted that the use of the detection extractor engine 110 is only exemplary. That is, the processor 105 being configured to extract the detections using the manner described above is only exemplary. According to a first example, the processor 105 receives image or video data such that the detections O may be extracted. The image or video data may be received via the I/O device 145. According to a second example, the processor 105 may simply receive the detections O. That is, a different component may perform the actual detection extraction and provide this data to the device 100. The detection extraction data may also be manually provided. Therefore, the extraction data may be received by the device 100 via the I/O device 145. For example, a vision system may be used, a RFID or other wireless protocol may be used, a non-vision based system may be used, etc. Accordingly, the device 100 may include corresponding components such that this data is received using the respective manner of data transmission.

The likelihood P(O|T) indicates how well a set of trajectories T matches the observations and the prior measurements P(T) describes how realistic the set of estimated player trajectories T is in the case of sports tracking. Specifically, the likelihood P(O|T) may be determined by the probability determining engine 130. In multi-target tracking, the prior measurement is often simplified to consider each trajectory in isolation and with Markov independence using the following:

$$P(T) \sim \prod_n P(T_n) \quad \text{(Equation 2)}$$

$$P(T) = \prod_n \prod_t P(T_n^t \mid T_n^{t-1}) \quad \text{(Equation 3)}$$

In team sports, the prior measurement is a highly complex function and is not well approximated by a series of independent trajectory assessments. The exemplary embodiments utilize a formulation of conditional independence between trajectories but model each individual trajectory as a sequence of mid-level tracklets, where the probability of one mid-level tracklet being an immediate successor of another mid-level tracklet is conditioned on both kinematic and game context features θ (which describe the current state of the match):

$$P(T) \stackrel{def}{=} \prod_{n,t} P(T_n^{t-1} \to T_n^t \mid \theta) \quad \text{(Equation 4)}$$

Therefore, individual trajectories are analyzed and utilized in a global manner. The game context features θ may be determined using the context determining engine 120. The game context features θ will be described in further detail below. Conditioning the individual motion models on game context implicitly encodes higher-order inter-trajectory relationships and long-term intra-trajectory information without sacrificing tractability.

Figure 3A:
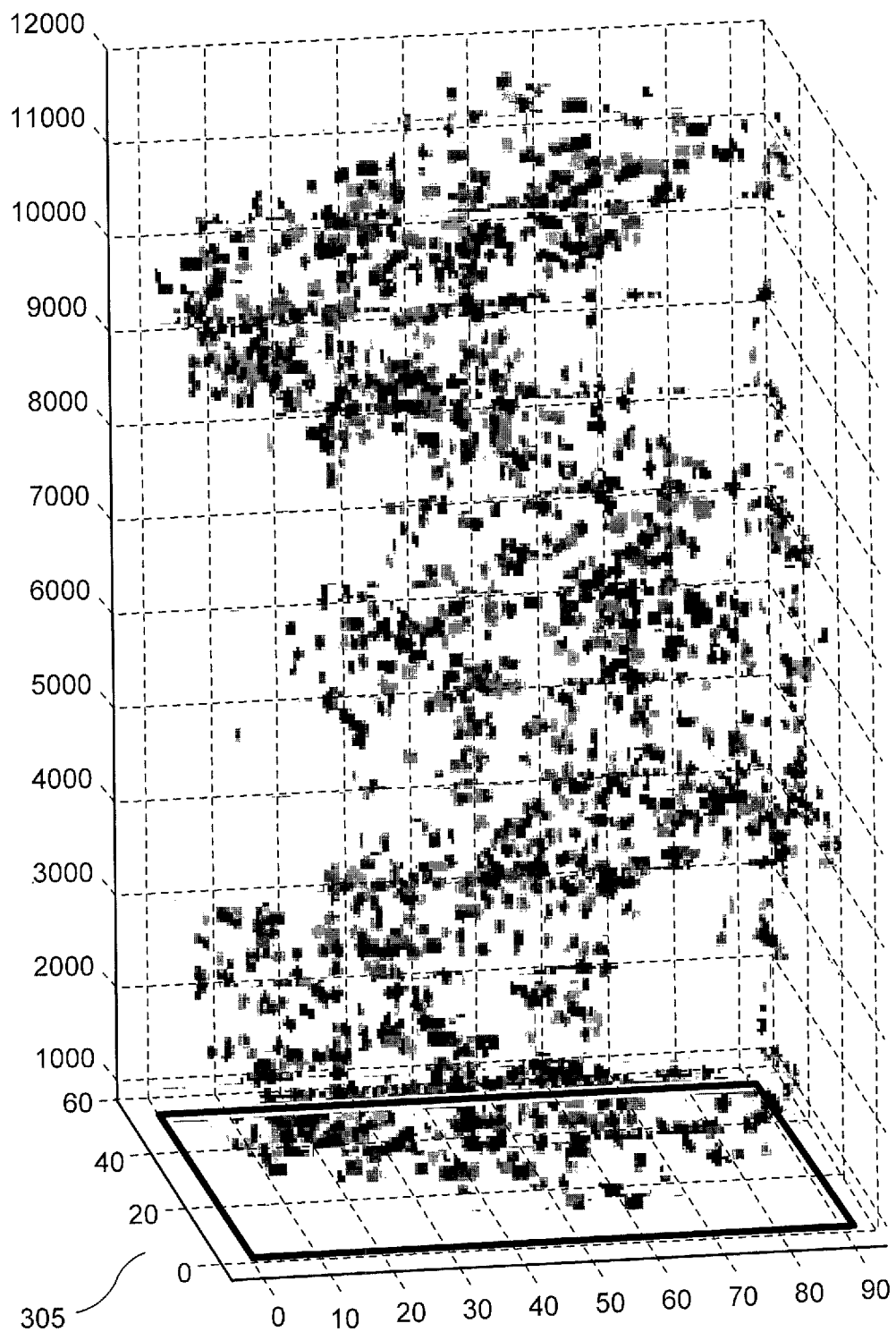
FIGS. 3A-C show a hierarchical association used by the device of FIG. 1 according to an exemplary embodiment.
Figure 3B:
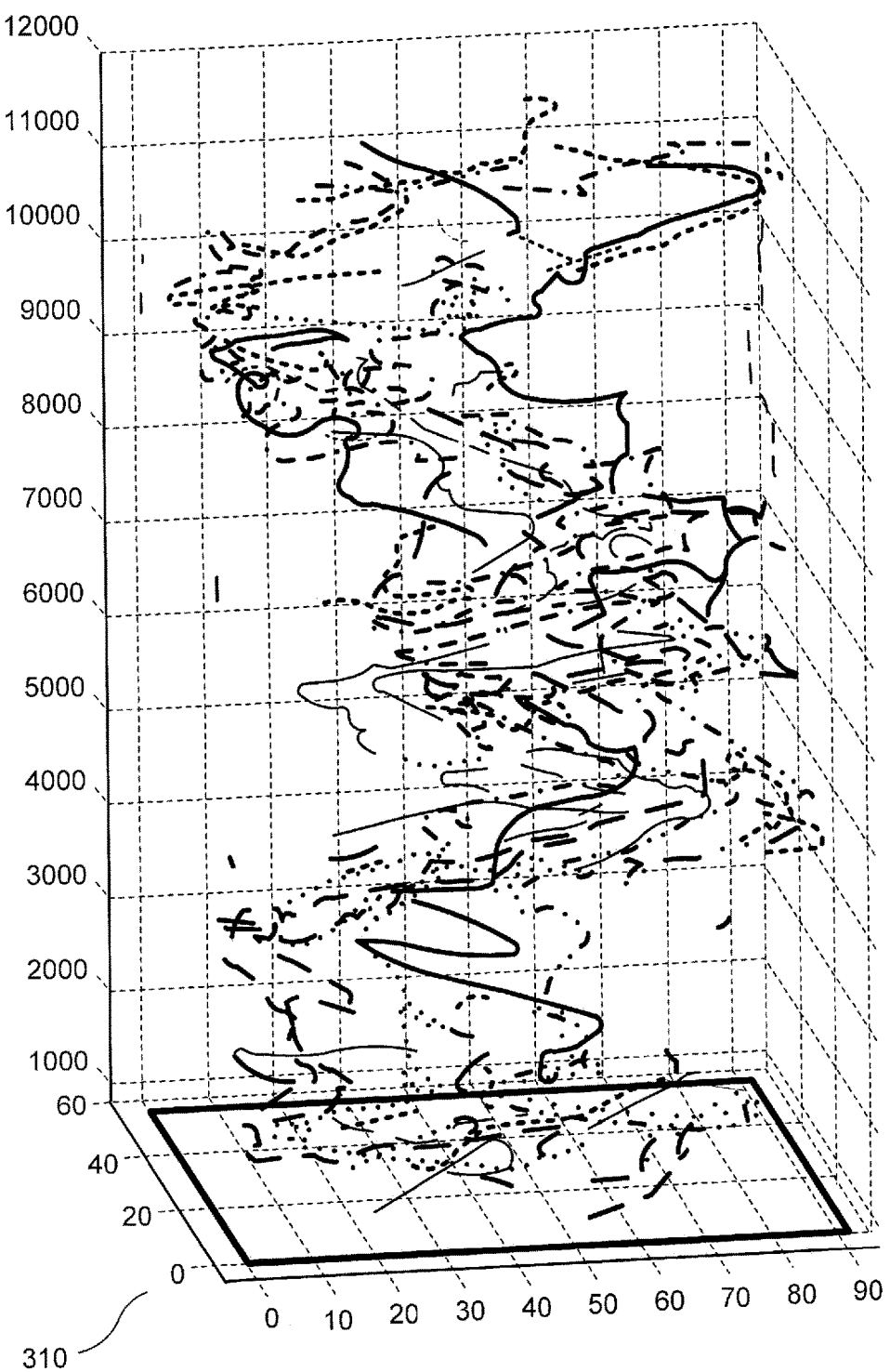
Figure 3C:
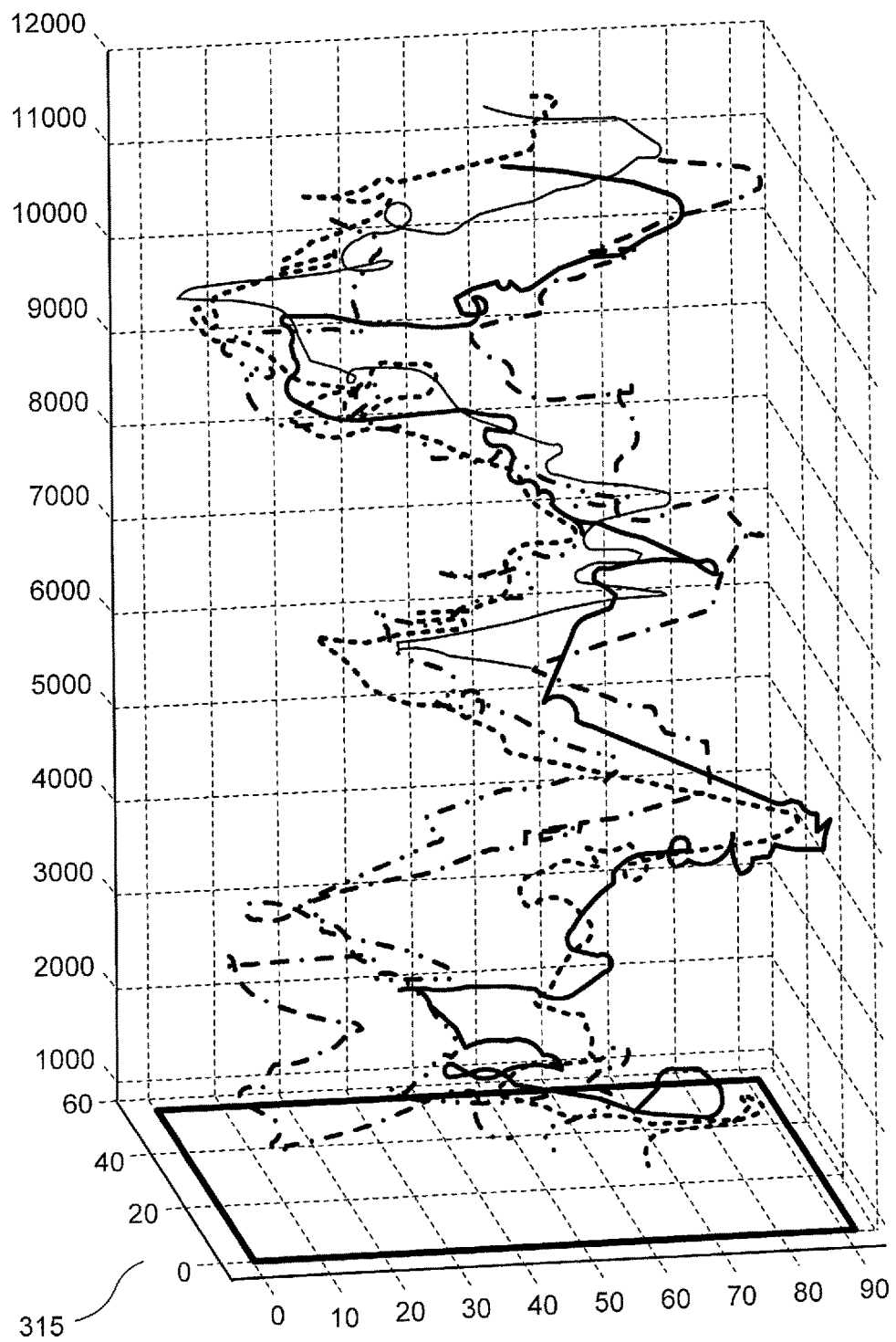

As a solution space of data association grows exponentially with the number of frames generated over time (each frame being, for example, an image captured at a moment in time during a match), the exemplary embodiments utilize a hierarchical association to handle sequences that are beyond a predetermined maximum of a short sequence (e.g., two (2) or less minutes in temporal length). Specifically, data association of tracklets in a low-level and a mid-level as well as a high-level track are utilized by the device 100. FIGS. 3A-C show the hierarchical association used by the device 100 of FIG. 1 according to an exemplary embodiment. Specifically, FIG. 3A shows a graph 305 of the low-level tracklets Y from noisy detections; FIG. 3B shows a graph 310 of the mid-level tracklets Γ obtained via the Hungarian algorithm; and FIG. 3C shows a graph 315 of the high-level trajectories T via a cost flow network. The cost flow network will be described in further detail below.

With regard to the low-level tracklets Y, a set of low-level tracklets Y is extracted from the detections by fitting constant velocity models to clusters of detections in 0.5 s long temporal windows. Specifically, a robust estimate algorithm, such as random sample consensus (RANSAC), may be used. However, it is again noted that the detections may also be received. Each low-level tracklet $Y_i$ represents an estimate of an object's instantaneous position and velocity. The low-level tracklets Y may be extracted by the detection extractor engine 110 or the trajectory determination engine 115 from the detections extracted by the detection extractor engine 110. It should be noted that the processor 105 may include yet another engine (not shown) that performs this particular functionality. That is, the processor 105 may include a dedicated engine for this functionality (e.g., an extractor engine for the low-level tracklets Y).

Figure 4A:
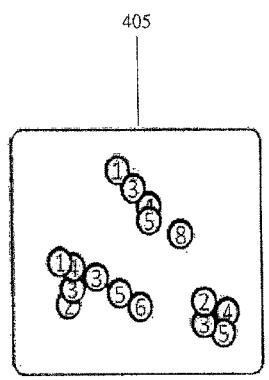
FIGS. 4A-C show detections and low-level tracklets used by the device of FIG. 1 according to an exemplary embodiment.
Figure 4B:
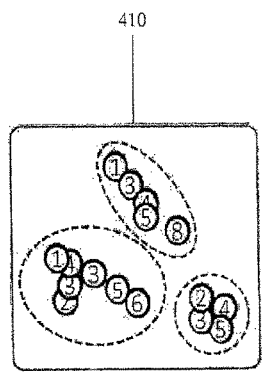
Figure 4C:
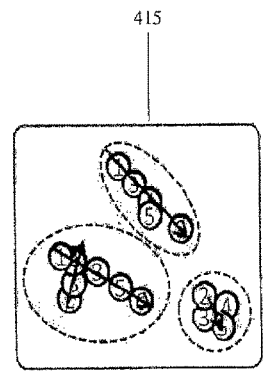

FIGS. 4A-C show detections and low-level tracklets used by the device 100 of FIG. 1 according to an exemplary embodiment. Specifically, FIGS. 4A-C illustrate the low-level tracklets and the estimations thereof. FIG. 4A illustrates a first view 405 of a local spatial-temporal volume in which detection responses are extracted. FIG. 4B illustrates a second view 410 of the local spatial-temporal volume in which clusters are identified. FIG. 4C illustrates a third view 415 of the local spatial-temporal volume in which RANSAC fitted constant velocity models are determined. Again, the detection extractor engine 110 or the trajectory determination engine 115 may provide the processes to determine the detections responses, the clustering identification, and the RANSAC models. Furthermore, as noted above, the processor 105 may utilize the further engine that performs this particular functionality.

With regard to the mid-level tracklets Γ, the Hungarian algorithm is used to combine subsequent low-level tracklets into a set of mid-level tracklets Γ up to 60 s in duration. The detection extractor engine 110 or the trajectory determination engine 115 may automatically determine the appropriate number of mid-level tracklets Γ. For example, the determination may be based upon a predetermined number, a number in which the mid-level tracklets Γ satisfy predetermined criteria, etc. However, the number of mid-level tracklets Γ may be tuned to utilize shorter, more reliable tracklets. The detection extractor engine 110 or the trajectory determination engine 115 may terminate the generation of a mid-level tracklet $\Gamma_i$ when an abrupt motion occurs or when a player is not detected for more than a predetermined time period such as two (2) seconds.

Figure 5:
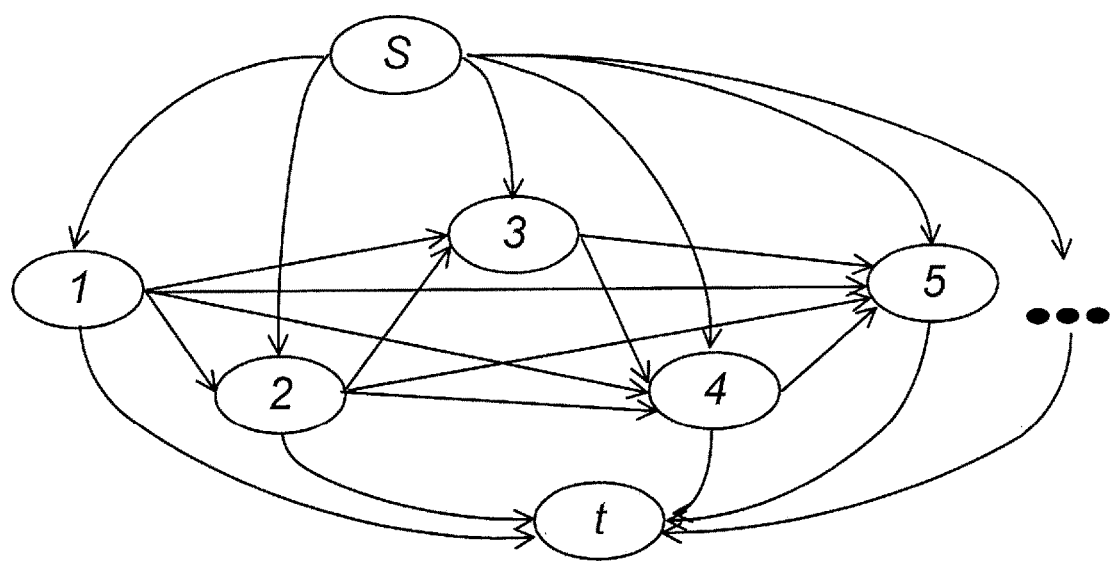
FIG. 5 shows a cost flow network used by the device of FIG. 1 according to an exemplary embodiment.

With regard to the high-level trajectories T, a maximum a posteriori probability (MAP) association is equivalent to a minimum cost flow in a cost flow network where a vertex i is defined for each mid-level tracklet $\Gamma_i$ and edge weights reflect the likelihood and prior measurement used in Equation 4. FIG. 5 shows a cost flow network 500 used by the device 100 of FIG. 1 according to an exemplary embodiment. For example, the high-level trajectory determination engine 135 may utilize the cost flow network 500. Unlike the Hungarian algorithm, it is possible to constrain solutions to have exactly N trajectories by pushing N units of flow between special source s and sink t vertices. The complete trajectory $T_n$ of each player may be estimated by the minimum cost path for one unit of flow from s to t (or via a successive shortest path algorithm). The cost $c_{ij}$ per unit flow from i to j indicates the negative affinity or negative log likelihood that $\Gamma_j$ is the immediate successor of $\Gamma_i$ which is decomposed into probabilities in continuity of appearance, time and motion using the following:

$$c_{ij} = -\log P(O|\Gamma_i \to \Gamma_j) P(\Gamma_i \to \Gamma_j | \theta) \quad \text{(Equation 5)}$$

$$c_{ij} = -\log(P_a \cdot P_T \cdot P_m) \quad \text{(Equation 6)}$$

The probability process may be performed using the probability determining engine 130. The probability determining engine 130 may also determine the probability that $\Gamma_i$ and $\Gamma_j$ belong to the same team with the following:

$$P_a(\Gamma_i \to \Gamma_j) = a_i \cdot a_j + (1-a_i) \cdot (1-a_j) \quad \text{(Equation 7)}$$

where $a_i$ and $1-a_i$ are the confidence scores of the mid-level tracklet Γ belonging to team A and B, respectively.

Letting $t_{i0}$ and $t_{i1}$ denote the start and end times of $\Gamma_i$, respectively, and if $\Gamma_j$ is the immediate successor of $\Gamma_i$, any non-zero time gap implies that missed detections must have occurred. Therefore, the probability determining engine 130 may determine the probability based upon temporal continuity with the following:

$$P_T(\Gamma_i \to \Gamma_j) \propto \exp(-\lambda(t_{j0} - t_{i1})) \quad \text{(Equation 8)}$$

Each mid-level tracklet $\Gamma_i$ has "miss-from-the-start" and "miss-until-the-end" costs on edges (s, i) and (i, t), respectively. The weights are computed using Equation 8 for temporal gaps ($T_0$, $t_{i0}$) and ($t_{j1}$, $T_1$), where $T_0$ and $T_1$ are the global start and end times of the sequence.

The form $P_m(\Gamma_i \to \Gamma_j | \theta)$ (as noted in Equation 6) will be discussed in more detail below. Prior to that discussion, the extraction of a set of fixed-length game context features θ from a set of noisy detections O will first be described.

In team sports, players assess the current situation and react accordingly. For example, in a basketball game, a team on defense may utilize a man-to-man defense or a zone defense. The players on defense will react according to this defensive plan based upon the manner in which the players on offense react. As a result, a significant amount of contextual information is implicitly encoded in player locations. In practice, the set of detected player positions in each frame contains errors including both missed detections and false detections. That is, the detections generated by the detection extraction engine 110 may include such errors. According to the exemplary embodiments, the context determining engine 120 may utilize features for describing the current game situation that may be extracted from a varying number of noisy detections, such as player locations {(x, y)}. Specifically, four features may be utilized: an absolute occupancy map, a relative occupancy map, a focus area, and a chasing indicator.

With regard to the absolute occupancy map, the exemplary embodiments describe the distribution of players during a time interval using an occupancy map that represents a spatial quantization of the playing surface. Specifically, the absolute occupancy map relates to an entire playing surface. It may be assumed that players exhibit different motion patterns under different spatial distributions. For example, when most players are detected near a center of play, lateral motions may occur less frequently because the attacking team is most likely trying to move towards the opposition's end in a longitudinal manner.

The context determining engine 120 computes a time-averaged player count for each quantized area. It may be assumed that the same distribution may arise regardless of which team is attacking. That is, a 180° rotational symmetry is implied in the data extracted by the detection extractor engine 110. Similarly, it may be assumed that there is a left/right symmetry for each time, resulting in a four-fold compression of the feature space.

According to the exemplary embodiments, the context determining engine 120 utilizes K-means clustering (similar to visual words) to identify four common distributions roughly characterized as center concentrated, center diffuse, goal, and corner. FIGS. 6A-D show the occupancy maps used by the device 100 of FIG. 1 according to an exemplary embodiment. Specifically, FIGS. 6A-D show the four common distributions.

Figures 6A, 6B:
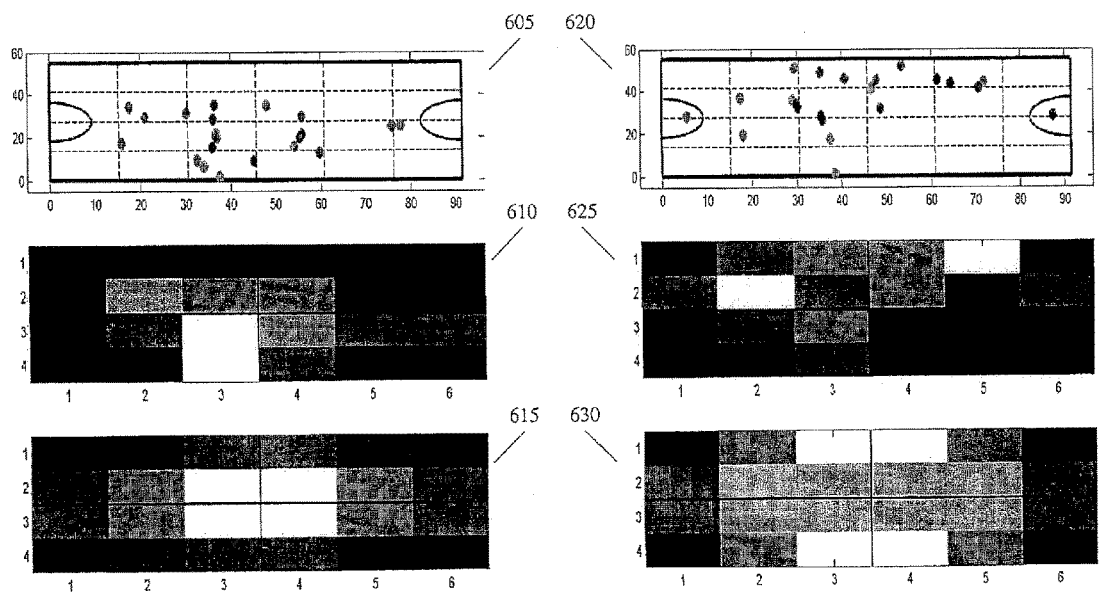

FIG. 6A relates to a center concentrated distribution. Specifically, a noisy detection 605 generated by the detection extractor engine 110 shows the players in a field hockey match near a center of the space. The context determining engine 120 estimates an occupancy map 610 based upon the noisy detection 605. Subsequently, the context determining engine 120 determines a corresponding cluster center 615. FIG. 6B relates to a center diffuse distribution. Specifically, a noisy detection 620 generated by the detection extractor engine 110 shows the players in a field hockey match dispersed near a center of the space. The context determining engine 120 estimates an occupancy map 625 based upon the noisy detection 620. Subsequently, the context determining engine 120 determines a corresponding cluster center 630. FIG. 6C relates to a goal concentrated distribution. Specifically, a noisy detection 635 generated by the detection extractor engine 110 shows the players in a field hockey match near a goal of the space (a longitudinal end). The context determining engine 120 estimates an occupancy map 640 based upon the noisy detection 635. Subsequently, the context determining engine 120 determines a corresponding cluster center 645. FIG. 6D relates to a corner concentrated distribution. Specifically, a noisy detection 650 generated by the detection extractor engine 110 shows the players in a field hockey match near a corner of the space. The context determining engine 120 estimates an occupancy map 655 based upon the noisy detection 650. Subsequently, the context determining engine 120 determines a corresponding cluster center 660. It is noted that the cluster centers 615, 630, 645, 660 are symmetric horizontally and vertically as discussed above. It should also be noted that the use of four (4) distributions is only exemplary. Depending on the space in which the sport is played as well as the sport itself, other distributions or additional distributions may be utilized by the context determining engine 120. Similarly, the spatial quantization scheme may be different between sports and may be spatially varying.

When evaluating the affinity for $\Gamma_i \rightarrow \Gamma_j$ of the mid-level tracklets $\Gamma$, the context determining engine 120 averages the occupancy vector over the time window $(t_{i1}, t_{jO})$ and the nearest cluster identification is taken as the context feature of absolute occupancy $\theta_{ij}^{(A)} = k \in \{1, \ldots K\}$.

With regard to the relative occupancy map, the relative distribution of players is often indicative of identity of a specific player or type of player. For example, in a field hockey match, a forward on the right side typically remains in front and to the right of teammates regardless of whether the team is defending in the back-court or attacking in the front-court. Additionally the motion of a player is often influenced by nearby players.

Figures 1, 7A:
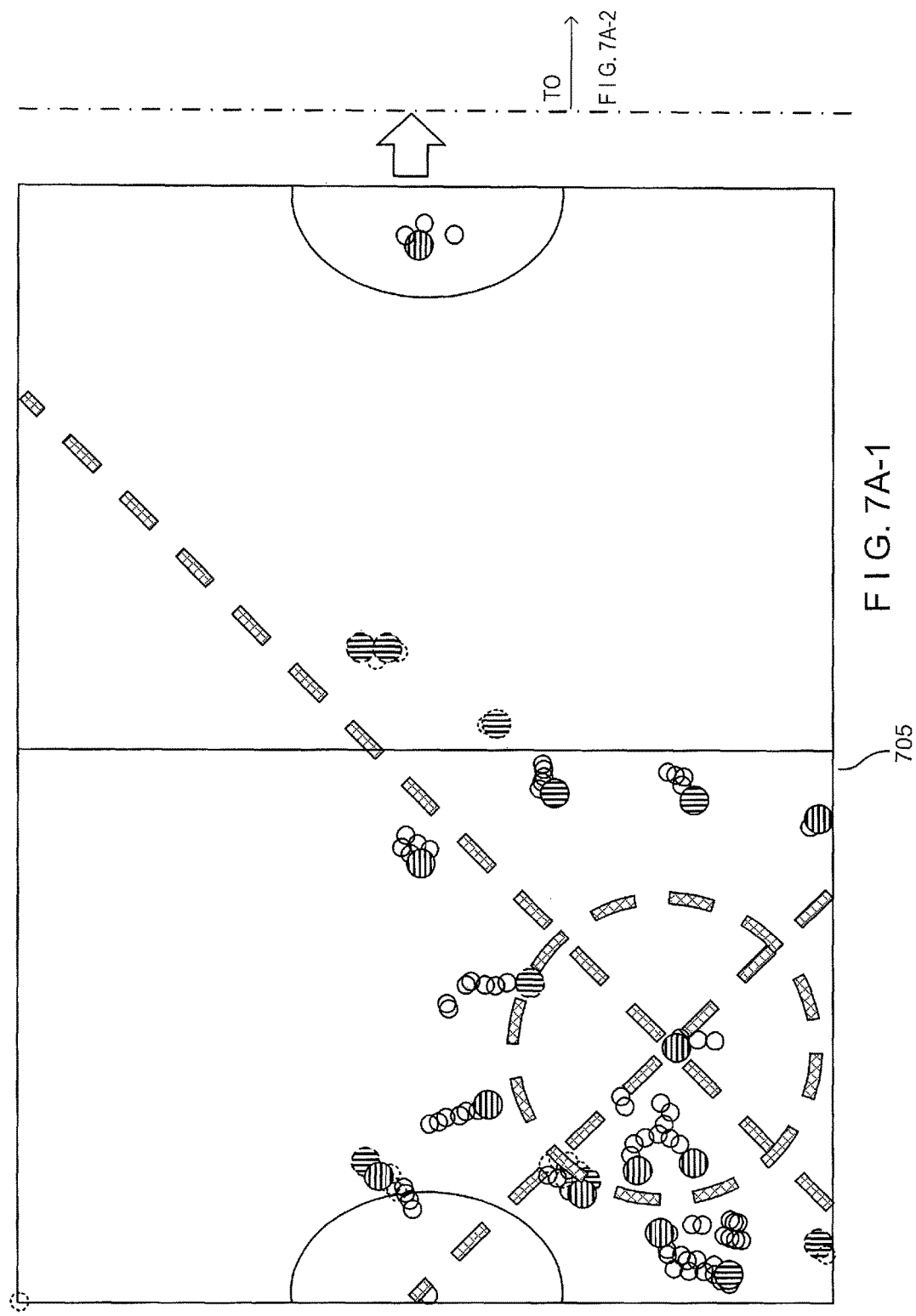
Figures 2, 7A:
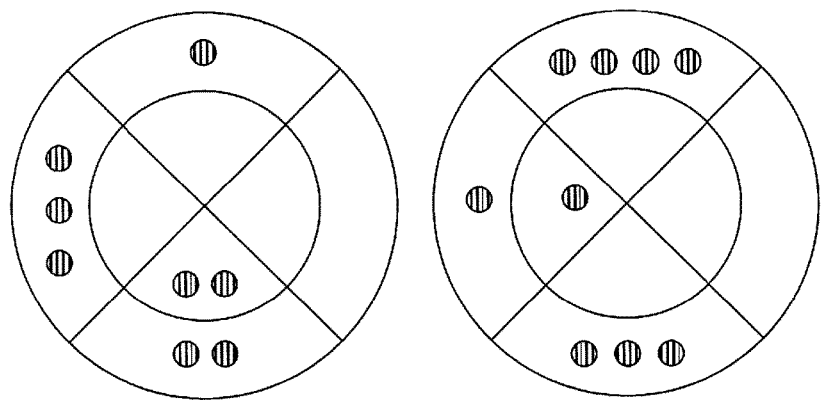

Accordingly, the context determining engine 120 defines a relative occupancy map specific to each low-level tracklet which quantizes space similarly to the shape context representation. That is, distance is divided into two levels with a predetermined threshold (e.g., four (4) meters in a field hockey field) and direction into four. FIGS. 7A-1 and 7A-2 show first and second portions of a relative occupancy map 705 used by the device 100 of FIG. 1 according to an exemplary embodiment. As shown, the relative occupancy map 705 is for a field hockey field in which the distance is divided into two levels 710 and quantized as shown in the row 715. The quantization scheme is centered on a particular low-level tracklet at time t. The remaining low-level tracklets are separated based on team assignment and organized into spatial bins. The per-team occupancy count is then normalized to sum to one for both the inner circle and outer ring. Like absolute occupancy maps, the context determining engine 120 clusters the thirty-two (32) bin relative occupancy counts using K-means.

For each pair of mid-level tracklets $(\Gamma_i, \Gamma_j)$, the context determining engine 120 extracts the relative occupancy vector $v_i$ and $v_j$ with cluster ID $k_i$, $k_j$, from the end tracklet of $\Gamma_i$ and the beginning tracklet of $\Gamma_j$. The context determining engine 120 also computes the Euclidian distance of $d_{ij} = |v_i - v_j|_2$ so that the context feature of relative occupancy is the concatenation of $\theta_{ij}^{(R)} = (d_{ij}, k_i, k_j)$.

With regard to the focus area, there is often a local region with relatively high player density that moves smoothly in time and may indicate the current or future location of a target such as a ball in a team sport environment such as soccer or basketball. The movement of the focus area in absolute coordinates also strongly correlates to high-level events such as a turnover. The context determining engine 120 assumes the movement of individual players should correlate with that of the focus area over long time periods. Thus, this feature is utilized (and useful) for associations in the mid-level tracklets $\Gamma_i \rightarrow \Gamma_j$ with large temporal gaps (e.g., when the motion prediction is also less reliable).

Figure 7B:
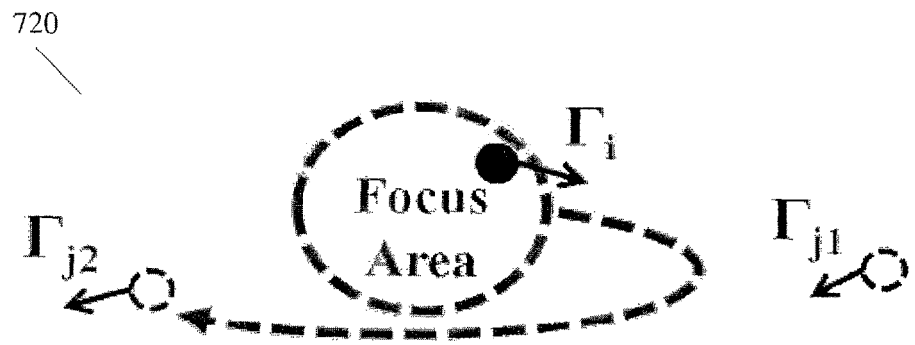
FIG. 7B shows a focus area map used by the device of FIG. 1 according to an exemplary embodiment.

FIG. 7B shows a focus area map 720 used by the device 100 of FIG. 1 according to an exemplary embodiment. Mid-level tracklet $\Gamma_i$ is more likely to be matched to $\Gamma_{j1}$ with a constant velocity motion model. However, if the tracklet of the focus area is provided such as that shown in FIG. 7B, it is reasonable to assume $\Gamma_i \rightarrow \Gamma_{j2}$ has a higher affinity than $\Gamma_i \rightarrow \Gamma_{j1}$. As player motions are globally correlated, kinematic constraints are less reliable across larger time windows and the affinity of two mid-level tracklets $\Gamma$ over large windows should agree with the overall movement trend of the focus area.

Accordingly, the context determining engine 120 estimates the location and movement of the focus area by applying mean-shift mode-seeking to track the local center of mass of the noisy player detections. The radius (kernel bandwidth) of the local region is set to one quarter (¼) of the playing surface diagonal distance. Given a pair of mid-level tracklets $(\Gamma_i, \Gamma_j)$, the context determining engine 120 interpolates the tracklets within the temporal window $(t_{i1}, t_{j2})$ and calculate their correlation with the tracklet of the focus area $c_{ij}$. The context determining engine 120 also extracts the average speed of the focus area $v_f$ during the time window which describes the momentum of the global motion. The focus area context feature is thus set at $\theta_{ij}^{(F)} = (c_{ij}, v_f)$.

Figure 7C:
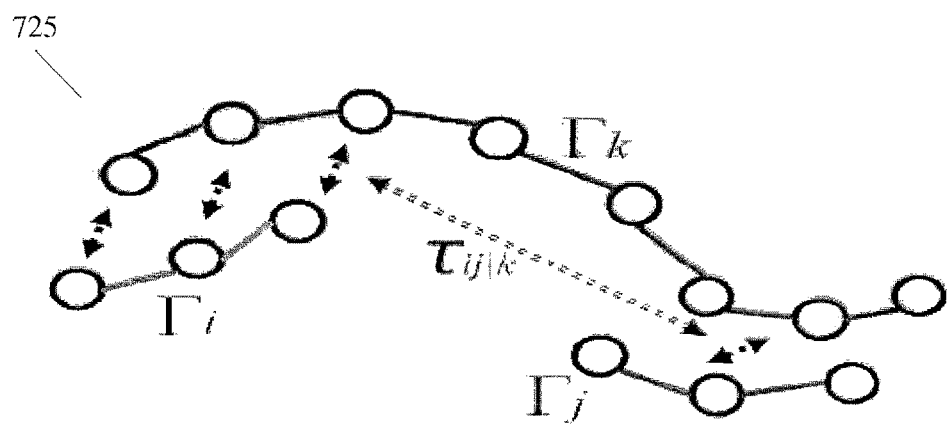
FIG. 7C shows a chasing detection map used by the device of FIG. 1 according to an exemplary embodiment.

With regard to the chasing detection, individual players in a team sport are often instructed to follow or mark a particular opposition player. For example, in basketball, a commonly used strategy is a one-on-one defense system where a defending player is assigned to follow a corresponding attacking player. The context determining engine 120 utilizes chasing (or close-interaction) links to detect when one player is marking another. FIG. 7C shows a chasing detection map 725 used by the device 100 of FIG. 1 according to an exemplary embodiment. If mid-level tracklets $\Gamma_i$ and $\Gamma_j$ both appear to be following a nearby mid-level tracklet $\Gamma_k$, there is a strong possibility that mid-level tracklet $\Gamma_j$ is the continuation of $\Gamma_i$.

The context determining engine 120 identifies chasing links by searching for pairs of low-level tracklets $(Y_i, Y_k)$ that are less than two (2) meters apart and moving in directions within 45° of each other. By defining the temporal gap between the last link of the mid-level tracklet $\Gamma_i$ with the mid-level tracklet $\Gamma_k$ and the first link of the mid-level tracklet $\Gamma_j$ with the mid-level tracklet $\Gamma_k$ as $\tau_{ij|k}$ and where $\tau_{ij|k} = \infty$ when there are no links between either mid-level tracklet $\Gamma_i$ or $\Gamma_j$ and mid-level tracklet $\Gamma_k$, the chasing continuity feature $\theta_{ij}^{(C)}$ that measures whether mid-level tracklets $\Gamma_i$ and $\Gamma_j$ are marking a same player may be defined as:

$$\theta_{ij}^{(C)} = \min_{k=1,\ldots /i,j} \{\tau_{ij|k}\} \qquad \text{(Equation 9)}$$

Intuitively, the smaller $\theta_{ij}^{(C)}$ is, the more likely that mid-level tracklets $\Gamma_i$ and $\Gamma_j$ belong to the same player.

The above description provides a set of context features to be defined: $\theta=\{\theta^{(A)},\theta^{(R)},\theta^{(F)}),\theta^{(C)}\}$. Specifically, $\theta^{(A)}$ relates to the context feature in the absolute occupancy map, $\theta^{(R)}$ relates to the context feature in the relative occupancy map, $\theta^{(F)}$ relates to the context feature in the focus area, and $\theta^{(C)}$ relates to the context feature in the chasing detection. The set of context features $\theta$ as generated by the context determining engine 120 may be used in a single fusion method for generating a final probability of motion likelihood score by the probability determining engine 130. The probability determining engine 130 may determine a weighting scale for each context feature as the advantages of different context features may vary in different situations (e.g., focus area may be more useful for large time gaps between mid-level trajectories while absolute occupancy maps may be more useful for smaller time gaps). Context features may have varying importance between different team sports as well. For example, the chasing-based context feature is less important in team sports where one-on-one defense is less common.

The exemplary embodiments utilize a framework general across different sports through a purely data-driven approach to learn a motion likelihood based on kinematic and game context features using a random decision forest. Specifically, the game context features may be determined as discussed above while kinematic features may be determined using the kinematic extraction engine 125 that utilizes kinematic features relating to a temporal gap ($t_g$), a constant-position prediction error ($e_0$), a constant-velocity prediction error ($e_1$), a constant-acceleration prediction error ($e_2$), and a change in velocity ($\Delta v$).

The probability determining engine 130 may use kinematic features $f_{ij}^{(K)}$ and game context features $\theta_{ij}$ extracted for all pairs of mid-level tracklets ($\Gamma_i$, $\Gamma_j$). Using ground truth tracking data, the probability determining engine 130 assigns binary labels $y_{ij}\in\{1,0\}$ indicating whether the association $\Gamma_i\to\Gamma_j$ is correct or not. A random forest containing decision trees (e.g., five hundred (500) decision trees) may then be trained to learn the mapping $C(f_{ij}^{(k)},\theta_{ij})\to y_{ij}$. That is, the random forest provides a regression algorithm used by the probability determining engine 130. By recursively splitting the data with random subsets of context features, the probability determining engine 130 may automatically optimize local adaptivity. That is, long gap association and short gap association may be split at different levels and handled with different context feature sets. Thus, the average classification score across all decision trees provides a continuous affinity score (e.g., probability) ranging from 0 and 1 and the motion inconsistency cost (on network edges) to approximate $-\log(P_m)=-\log P(\Gamma i\to\Gamma_j|\theta)=-\log C(f_{ij}^{(K)},\theta_{ij})$ as defined in Equation 5. It should be noted that any regression algorithm may be used to learn this mapping, such as support vector machines (SVM). It should be noted that the use of the random forest as the regression algorithm is only exemplary. Those skilled in the art will understand that other regression algorithms may be used to learn the mapping described above.

Figure 8:
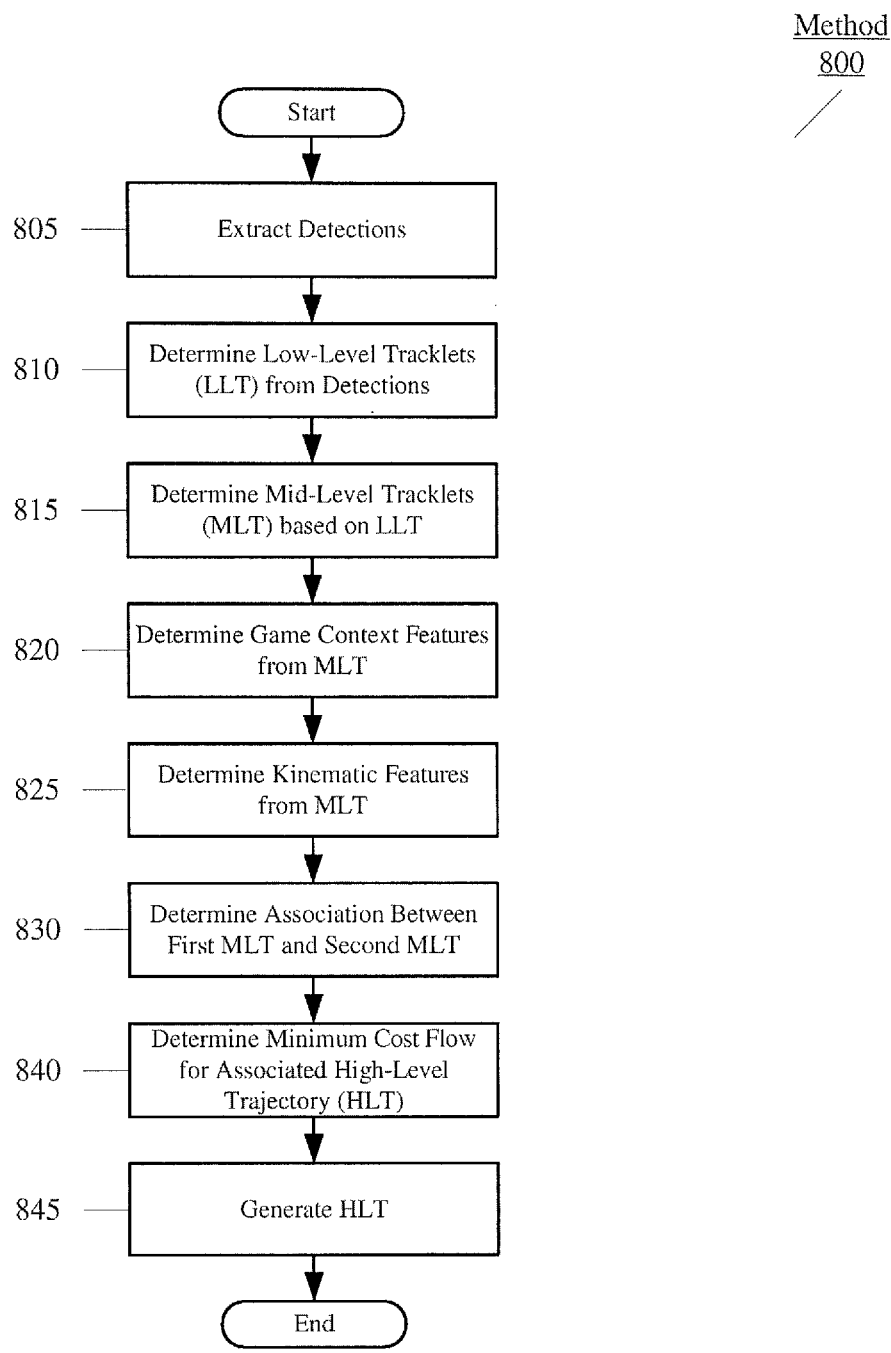
FIG. 8 shows a method of generating high-level trajectories according to an exemplary embodiment.

FIG. 8 shows a method 800 of generating high-level trajectories according to an exemplary embodiment. The method 800 relates to utilizing detections to generate the low-level and mid-level tracklets. The detections and mid-level tracklets are used to determine game context features and kinematic features such that an affinity between every pair of mid-level tracklets is determined. A minimum cost flow is used to identify the most probable set of mid-level tracklets for each high-level trajectory. The method 800 will be described with reference to the device 100 of FIG. 1 and the various data illustrated in FIGS. 2-7C.

In step 805, the detection extractor engine 110 extracts detections O from a team sports match such as the views illustrated in FIGS. 2A-2D. Each detection that is extracted may be associated with an (x,y) location relative to a playing field of the team sports match, a time stamp indicating when the detection is extracted during the match, and appearance information of the detection such as color or as determined from a facial recognition algorithm. It should again be noted that this step of extracting the detections O is only exemplary and that the device 100 may be configured to receive the detections O using a variety of different manners.

In step 810, the trajectory determination engine 115 determines low-level tracklets Y from the detections. As discussed above, the solution space of data association grows exponentially with the number of frames (e.g., detections over an increasing time period). Thus, the hierarchical association is used in which the low-level tracklets Y are first determined. The trajectory determination engine 115 may determine the low-level tracklets Y by fitting constant velocity models to clusters of detections in short increments of time such as 0.5 s long temporal windows via RANSAC. Specifically, the low-level tracklets Y are an estimate of an object's instantaneous position and velocity.

In step 815, the trajectory determination engine 115 determines mid-level tracklets $\Gamma$ based on the low-level tracklets Y. The mid-level tracklets $\Gamma$ may be a combination of continuous low-level tracklets Y up to an increased temporal duration (e.g., 60 s). As discussed above, the trajectory determination engine 115 may determine an appropriate number of mid-level tracklets $\Gamma$ based upon a variety of factors.

In step 820, the context determining engine 120 determines the game context features based upon the mid-level tracklets $\Gamma$. Using the mid-level tracklets $\Gamma$, the context determining engine 120 may determine a variety of different types of game context features from a general, overall view to a narrow view. In a first example, an absolute occupancy map may be determined in which a time-averaged player count for each quantized area over the space of the match is computed by the context determining engine 120. In a second example, a relative occupancy map may be determined in which this is defined for each mid-level tracklet $\Gamma$ in a quantized space similarly to the shape context representation of the field such that an occupancy vector is extracted by the context determining engine 120 having a cluster identification from the end and the beginning of a mid-level tracklet $\Gamma$. In a third example, a focus area may be determined in which movement of individual players correlate with that of the focus area over long time periods such that location and movement of the focus area is estimated by the context determining engine 120. In a fourth example, a chasing detection may be determined in which chasing links are identified by the context determining engine 120 for pairs of mid-level tracklets Γ within a given distance and movement direction such that a chasing continuity is used to determine the likelihood that a first mid-level trajectory $\Gamma_i$ is the same detected object for a second mid-level trajectory $\Gamma_j$. In step 825, the kinematic extraction engine 125 determines the kinematic features of the mid-level tracklets Γ.

In step 830, the device 100 may learn the association between the first mid-level tracklet $\Gamma_i$ and the second mid-level tracklet $\Gamma_j$. Specifically, the device 100 may utilize ground truth tracking data, kinematic features and game context features to generate a continuous value indicative of whether the first mid-level tracklet $\Gamma_i$ is associated with the second mid-level tracklet $\Gamma_j$. That is, this determination may relate to whether the first mid-level tracklet $\Gamma_i$ is for the same detected object as the second mid-level tracklet $\Gamma_j$. Accordingly, the probability determining engine 130 may compute for each pair (i,j) of mid-level tracklets the probability of mid-level tracklet $\Gamma_j$ being an immediate successor of mid-level $\Gamma_i$ using the extracted kinematic and game context features. The probability may be determined using a random forest such as that described above. When a random forest is used, the kinematic and game context features may be the basis for which the path down each tree is determined. That is, the various factors occurring at a given moment during a match are considered in their entirety to determine the relevant decision path in each tree.

It should be noted that the method 800 may further include additional steps relating to the training of the regression algorithm in which the random forest is used. As described above, the random forest provides the regression algorithm used by the probability determining engine 130. To ultimately utilize the regression probability provided by the random forest regression algorithm, the regression algorithm is "trained." By recursively splitting the data with random subsets of context features, the probability determining engine 130 may automatically optimize local adaptivity such that long gap association and short gap association may be split at different levels and handled with different context feature sets. It is again noted that the use of the random forest as the regression algorithm is only exemplary and that other regression algorithms may be used.

In step 840, the high-level trajectory determination engine 135 constructs a cost flow network from mid-level tracklets F and the probabilities generated by the probability determining engine 130. Each mid-level trajectory $\Gamma_i$ is represented as a vertex, and each edge weight between i and j is based on the probability of $\Gamma_j$ being the immediate successor of $\Gamma_i$. The high-level trajectory determination engine 135 determines the minimum cost flow for each high-level trajectory T assembled from a subset of mid-level tracklets Γ. The high-level trajectory determination engine 135 may utilize a cost flow network to constrain solutions using a special source and sink vertices within the cost flow network. The high-level trajectory determination engine 135 may determine the set of high-level trajectories T using a greedy or successive shortest paths algorithm. Accordingly, in step 845, the high-level trajectories T may be generated.

The exemplary embodiments provide a method and device for generating trajectories having the highest probability for a detected object. The most probable set of trajectories is determined based upon a hierarchical association regarding low-level tracklets, mid-level tracklets, and high-level trajectories. The tracklets and trajectories further provide input to determine game context features and kinematic features such that an association between first and second mid-level tracklets may be properly computed to determine a high-level trajectory. A minimum cost flow determines each subset of mid-level tracklets constituting each high-level trajectory.

The exemplary embodiments may provide the ability to track sports players which may be used in a variety of different applications. For example, the tracking provided by the exemplary embodiments may enable automating certain aspects of a broadcast production such as camera control or graphics insertion. In another example, the tracking provided by the exemplary embodiments may provide new statistical analyses based on spatial movement patterns. The tracking provided by the exemplary embodiments in which learning discriminative features based on historical data may further provide insight in tracking objects outside a sports environment in which objects move in a somewhat arbitrary yet consistent pattern. For example, parks and resorts may track people over large (e.g., park-wide) and small (e.g., attraction) areas. The motion patterns of crowds may also be analyzed using the tracking approach described herein. Similarly, the motion patterns of vehicles in traffic surveillance may be described on contextual data (such as the current traffic light state, presence of an accident, etc).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a plurality of tracklets indicative of movement of a plurality of targets over a predetermined temporal interval;
   determining a plurality of context data for a pair of tracklets based upon at least one additional tracklet, wherein the context data is indicative of a situation in a team sports match;
   computing a probability that the pair of tracklets relate to a first one of the targets, wherein the probability is determined based upon a regression;
   generating a trajectory for the first target based upon a concatenation of select ones of the tracklets, wherein the concatenation maximizes the probability that the pair of tracklets correspond to the first target based upon the context data associated with the pair of the tracklets,
   wherein the trajectory is used to control an orientation of a measurement device capturing at least part of the movement of the plurality of targets over the predetermined temporal interval, wherein the orientation corresponds to further movement of the first target of the plurality of targets over a further predetermined time interval.

2. The method of claim 1, wherein the probability is indicative of whether the one of the pair of the tracklets is an immediate successor in time of the other of the pair of the tracklets.

3. The method of claim 1, wherein the regression is a random forest including a plurality of decision trees that is trained to learn a mapping between the pair of tracklets.

4. The method of claim 1, wherein the received tracklets are determined by:
 detecting responses of the targets within a local spatial-temporal volume;
 identifying clusters of select targets within the volume; and
 determining random sample consensuses of the select targets within each cluster using constant velocity models.

5. The method of claim 4, wherein the context data includes at least one of an absolute occupancy map for an entire field of the team sports match, a relative occupancy map for a first partial area of the entire field, a focus area for a second partial area of the entire field in which the second partial area is a subset of the first partial area, and a chasing detection for the first target and a second target of the targets being tracked.

6. The method of claim 1, further comprising:
 generating the tracklets based upon a set of detections of each of the targets over the predetermined temporal interval.

7. The method of claim 6, wherein the tracklet is an incremental tracklet that is determined based upon the detection, the incremental tracklet being indicative of an estimate of an instantaneous position and velocity of the respective target.

8. The method of claim 1, further comprising:
 generating a further trajectory for a second one of the targets over the time period, the further trajectory being a further concatenation of select ones of the tracklets, wherein the further concatenation maximizes a probability that a further pair of tracklets correspond to the second target based upon the context data associated with the further pair of the tracklets.

9. A device, comprising:
 a processor coupled to a memory, wherein the processor is programmed to generate a trajectory for a first target of a plurality of targets by:
  receiving a plurality of tracklets indicative of movement of the targets over a predetermined temporal interval;
  determining a plurality of context data for a pair of tracklets based upon at least one additional tracklet, wherein the context data is indicative of a situation in a team sports match;
  computing a probability that the pair of tracklets relate to a first one of the targets, wherein the probability is determined based upon a regression;
  generating a trajectory for the first target based upon a concatenation of select ones of the tracklets,
  wherein the concatenation maximizes the probability that the pair of tracklets correspond to the first target based upon the context data associated with the pair of the tracklets,
  wherein the trajectory is used to control an orientation of a measurement device capturing at least part of the movement of the plurality of targets over the predetermined temporal interval, wherein the orientation corresponds to further movement of the first target of the plurality of targets over a further predetermined time interval.

10. The device of claim 9, wherein the probability is indicative of whether the one of the pair of the tracklets is an immediate successor in time of the other of the pair of the tracklets.

11. The device of claim 9, wherein the regression is a random forest including a plurality of decision trees that is trained to learn a mapping between the pair of tracklets.

12. The device of claim 9, wherein the processor is configured to determine the received tracklets by:
 detecting responses of the targets within a local spatial-temporal volume;
 identifying clusters of select targets within the volume; and
 determining random sample consensuses of the select targets within each cluster using constant velocity models.

13. The device of claim 9, wherein the context data includes at least one of an absolute occupancy map for an entire field of the team sports match, a relative occupancy map for a first partial area of the entire field, a focus area for a second partial area of the entire field in which the second partial area is a subset of the first partial area, and a chasing detection for the first target and a second target of the targets being tracked.

14. The device of claim 9, wherein the processor is configured to generate the tracklets based upon a set of detections of each of the targets over the predetermined time interval.

15. The device of claim 14, wherein the tracklet is an incremental tracklet that is determined based upon the detection, the incremental tracklet being indicative of an estimate of an instantaneous position and velocity of the respective target.

16. A non-transitory computer readable storage medium with an executable program stored thereon, wherein the program instructs a microprocessor to perform operations comprising:
 receiving a plurality of tracklets indicative of movement of a plurality of targets over a predetermined temporal interval;
 determining a plurality of context data for a pair of tracklets based upon at least one additional tracklet, wherein the context data is indicative of a situation in a team sports match;
 computing a probability that the pair of tracklets relate to a first one of the targets, wherein the probability is determined based upon a regression;
 generating a trajectory for the first target based upon a concatenation of select ones of the tracklets,
 wherein the concatenation maximizes the probability that the pair of tracklets correspond to the first target based upon the context data associated with the pair of the tracklets,
 wherein the trajectory is used to control an orientation of a measurement device capturing at least part of the movement of the plurality of targets over the predetermined temporal interval, wherein the orientation corresponds to further movement of the first target of the plurality of targets over a further predetermined time interval.

17. The method of claim 1, wherein the trajectory is used to insert a graphic into a video stream capturing the activities.

* * * * *